United States Patent
Chen et al.

(10) Patent No.: US 10,664,694 B2
(45) Date of Patent: May 26, 2020

(54) IMAGE DETECTION METHOD AND IMAGE DETECTION DEVICE FOR DETERMINING POSTURE OF A USER

(71) Applicant: Wistron Corp., New Taipei (TW)

(72) Inventors: Po Chun Chen, New Taipei (TW); Yu-Ren Lai, New Taipei (TW); Ching-An Cho, New Taipei (TW); Kuo Ting Huang, New Taipei (TW); Yu-Yen Chen, New Taipei (TW)

(73) Assignee: Wistron Corp., New Taipei (TW)

( * ) Notice: Subject to any disclaimer, the term of this patent is extended or adjusted under 35 U.S.C. 154(b) by 157 days.

(21) Appl. No.: 15/920,412

(22) Filed: Mar. 13, 2018

(65) Prior Publication Data

US 2019/0122039 A1    Apr. 25, 2019

(30) Foreign Application Priority Data

Oct. 23, 2017   (TW) .............................. 106136328 A

(51) Int. Cl.
*G06K 9/00* (2006.01)
*G06K 9/62* (2006.01)

(52) U.S. Cl.
CPC ..... *G06K 9/00369* (2013.01); *G06K 9/00281* (2013.01); *G06K 9/00375* (2013.01); *G06K 9/6201* (2013.01); *G06K 9/6255* (2013.01)

(58) Field of Classification Search
CPC . G06K 9/00369; G06K 9/6201; G06K 9/6255
See application file for complete search history.

(56) References Cited

U.S. PATENT DOCUMENTS

| | | | | |
|---|---|---|---|---|
| 5,555,512 A | * | 9/1996 | Imai | G06K 9/00369 250/342 |
| 9,058,744 B2 | * | 6/2015 | Huang | G06K 9/00785 |
| 10,387,720 B2 | * | 8/2019 | Johnson | G06K 9/00771 |
| 2003/0236474 A1 | * | 12/2003 | Singh | A61B 5/1126 600/595 |
| 2006/0239645 A1 | * | 10/2006 | Curtner | G08B 13/19606 386/228 |
| 2007/0136102 A1 | * | 6/2007 | Rodgers | A61B 5/1113 705/3 |

(Continued)

FOREIGN PATENT DOCUMENTS

| | | |
|---|---|---|
| CN | 103347438 A | 10/2013 |
| CN | 205814297 U | 12/2016 |

(Continued)

OTHER PUBLICATIONS

U.S. Appl. No. 15/904,237 to Lai et al., filed Feb. 23, 2018.

*Primary Examiner* — Santiago Garcia

(57) ABSTRACT

An image detection method for determining the postures of a user includes: obtaining a plurality of images of a user; determining whether the user moves; and when the user is determined to be moving, calculating whether the amount of images is greater than a first predetermined value or not, calculating whether or not the amount of images of the user in the region of interest (ROI) is greater than a second predetermined value, and calculating whether or not the amount of images of the user not in the ROI is greater than a third predetermined value, in order to determine the postures of the user.

22 Claims, 11 Drawing Sheets

(56) References Cited

U.S. PATENT DOCUMENTS

| | | | | |
|---|---|---|---|---|
| 2009/0195689 A1* | 8/2009 | Hwang | | G03B 13/36 |
| | | | | 348/349 |
| 2009/0278934 A1* | 11/2009 | Ecker | | G06K 9/00348 |
| | | | | 348/152 |
| 2010/0039447 A1* | 2/2010 | Nakao | | H04N 1/387 |
| | | | | 345/634 |
| 2010/0069756 A1* | 3/2010 | Ogasawara | | A61B 8/08 |
| | | | | 600/447 |
| 2010/0165113 A1* | 7/2010 | Abe | | G06K 9/6203 |
| | | | | 348/169 |
| 2011/0234838 A1* | 9/2011 | Naganuma | | G06T 13/80 |
| | | | | 348/222.1 |
| 2012/0026308 A1* | 2/2012 | Johnson | | G06K 9/00369 |
| | | | | 348/77 |
| 2012/0114099 A1* | 5/2012 | Yoshida | | A61B 6/4233 |
| | | | | 378/62 |
| 2014/0092247 A1* | 4/2014 | Clark | | H04N 7/181 |
| | | | | 348/143 |
| 2014/0163424 A1 | 6/2014 | Kawaguchi et al. | | |
| 2014/0168448 A1* | 6/2014 | Ozawa | | H04N 5/23216 |
| | | | | 348/170 |
| 2014/0204207 A1* | 7/2014 | Clark | | H04N 7/183 |
| | | | | 348/143 |
| 2014/0313340 A1* | 10/2014 | Ecker | | G06K 9/00348 |
| | | | | 348/152 |
| 2015/0131772 A1* | 5/2015 | Fujiwara | | G06T 7/20 |
| | | | | 345/424 |
| 2015/0339519 A1* | 11/2015 | Ueta | | H04N 5/275 |
| | | | | 382/103 |
| 2016/0004140 A1* | 1/2016 | Tada | | G03B 15/07 |
| | | | | 396/2 |
| 2016/0086347 A1* | 3/2016 | Ishihara | | H04N 5/23229 |
| | | | | 348/207.1 |
| 2016/0096506 A1* | 4/2016 | Shreve | | B60R 25/102 |
| | | | | 348/148 |
| 2018/0157905 A1* | 6/2018 | Yamashita | | G06K 9/00369 |
| 2018/0211104 A1* | 7/2018 | Zhao | | G06K 9/3233 |
| 2019/0130178 A1 | 5/2019 | Yamada et al. | | |
| 2019/0239761 A1* | 8/2019 | Tao | | A61B 5/0077 |

FOREIGN PATENT DOCUMENTS

| | | |
|---|---|---|
| CN | 107038402 A | 8/2017 |
| TW | 200607350 A | 2/2006 |
| TW | M468728 U | 12/2013 |
| TW | I469765 B | 1/2015 |
| TW | I478695 B | 4/2015 |

\* cited by examiner

IMAGE DETECTION METHOD AND IMAGE DETECTION DEVICE FOR DETERMINING POSTURE OF A USER

CROSS REFERENCE TO RELATED APPLICATIONS

This Application claims priority of Taiwan Patent Application No. 106136328 filed on Oct. 23, 2017, the entirety of which is incorporated by reference herein.

BACKGROUND OF THE INVENTION

Field of the Invention

The disclosure generally relates to an image detection method and an image detection device, and more particularly, to an image detection method and an image detection device for determining the posture of a user.

Description of the Related Art

Image detection technology can be utilized to determine the various postures and physical parameters of a user, in order to achieve the goal of monitoring and taking care of elderly people. From the user's point of view, the physical information of the user can be obtained by wearing a smart wearable electronic device such as a wristband. However, it may have the problem of lacking electric power. In addition, wearing the smart wearable electronic device could be uncomfortable or inconvenient for older people. The user's state could be detected by a method of image detection which provides electric power for a long time without affecting the user. Therefore, an image detection method and an image detection device are needed to improve the identification rate and detection efficiency.

BRIEF SUMMARY OF THE INVENTION

In order to solve the aforementioned problem, the invention proposes an image detection method and an image detection device. The present invention subtracts several images to obtain the pixel difference and determine whether the user moves or not. When it is determined that the user moves, the posture of the user is determined by performing multiple matching analysis associated with several predetermined value. By utilizing the omnidirectional image detection method, the sleeping posture of the user could be accurately identified based on the body feature and multiple matching analysis with several predetermined value no matter whether the face is identified or not. Therefore, the purpose of taking care of the user can be achieved.

In one embodiment of the invention, an image detection method for determining the posture of a user is provided. The image detection method includes obtaining a plurality of images of a user; determining whether the user moves or not; when it is determined that the user moves, calculating whether the number of images is greater than a first predetermined value or not, calculating whether the number of images where the user is on a region of interest (ROI) is greater than a second predetermined value or not, and calculating whether the number of images where the user is not on the ROI is greater than a third predetermined value or not, in order to determine the posture of the user.

The ROI is a bed where the user lies down, and the feature parameter comprises face, skin color or any facial feature of the user. Whether the user is in a supine position or not is determined by the feature matching analysis. When it is determined that the user is not in the supine position, executing a skin color matching analysis for the images. When the results of the skin color matching analyses are similar, it is determined that the user is in a lateral recumbent position. When the results of the skin color matching analyses are not similar, it is determined that the face of the user is shielded.

In addition, when the number of images is greater than the first predetermined value, the moving tendency of the user is detected to determine whether the user gets up or turns. When the number of images where the user is on the ROI is greater than the second predetermined value, it is determined that the user is on the bed. When the number of images is greater than the first predetermined value, a calculation is made as to whether the number of images where the user is not on the ROI is greater than the third predetermined value or not. When the number of images where the user is not on the ROI is greater than the third predetermined value, it is determined that the user is off the bed. When the number of images where the user is not on the ROI is not greater than the third predetermined value, a calculation is made as to whether the pixel difference is greater than a fourth predetermined value or not.

Specifically, when the pixel difference is greater than the fourth predetermined value, the moving tendency of the user is detected to determine whether the user lies down or not. When the pixel difference is greater than the fourth predetermined value, the moving tendency of the user is detected to determine whether the user gets up or moves without getting up. When the pixel difference is not greater than the fourth predetermined value, a calculation is made as to whether the pixel difference is greater than a fifth predetermined value or not, wherein the fifth predetermined value is smaller than the fourth predetermined value, and it is determined that the user is trembling when the pixel difference is greater than the fifth predetermined value.

In another embodiment of the invention, an image detection device is provided. The image detection device includes a sensor, a notification device and a processor. The sensor is configured to obtain a plurality of images of the user. The processor is configured to determine whether the user moves or not. When it is determined that the user moves, the processor calculates whether the number of images is greater than a first predetermined value or not, calculates whether the number of images where the user is on a region of interest (ROI) is greater than a second predetermined value or not, and calculates whether the number of images where the user is not on the ROI is greater than a third predetermined value or not, in order to determine the posture of the user.

Other aspects and features of the present invention will become apparent to those with ordinarily skill in the art upon review of the following descriptions of specific embodiments of the image detection method and the image detection device for determining the posture of the user.

BRIEF DESCRIPTION OF DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF THE INVENTION

Figure 1A:
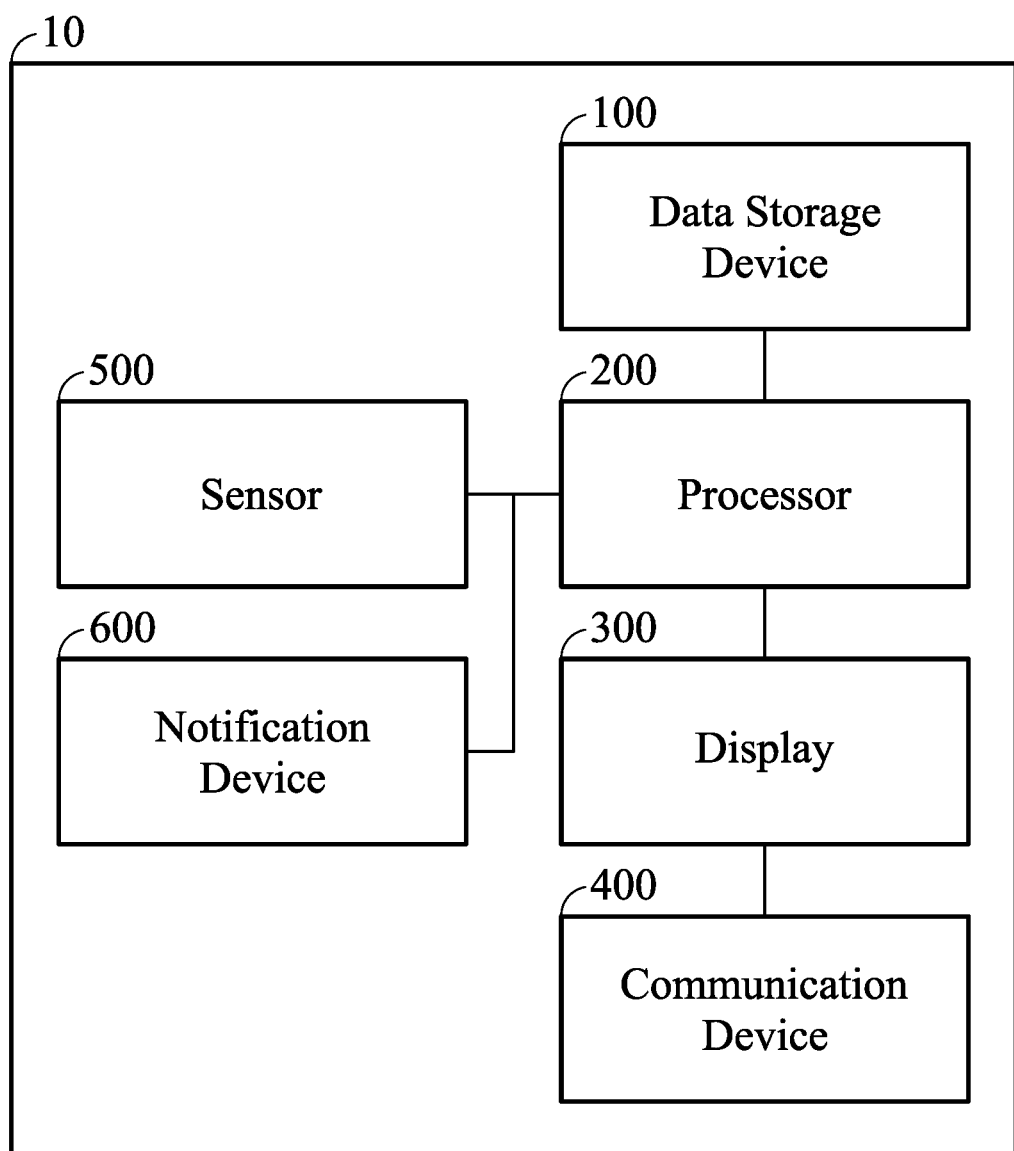
FIG. 1A is a schematic of an image detection device according to an embodiment of the invention.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

FIG. 1A is a schematic of an image detection device according to an embodiment of the invention. The image detection device 10 includes a data storage device 100, a processor 200, a display 300, a communication device 400, a sensor 500 and a notification device 600. The image detection device 10 could be an independent electronic device, or it could be embedded in a mobile electronic device such as a cell phone, a tablet computer, a laptop computer, a gaming apparatus, an electronic book, or a PDA; or it could be an electronic device such as a desktop calculator, a server, a ticket machine, a digital picture frame, a point-of-sale terminal, or a digital map; or it could be any electronic device equipped with a touch connection module (such as a touch IC). The data storage device 100 includes one or more of the following: a random access memory (RAM), a read-only memory (ROM), a flash memory, a hard disk, a soft disk, a magnetic memory, a compact disc (CD), or a digital video disk (DVD).

In addition, the processor 200 of the image detection device 10 is coupled to the data storage device 100 to access the data in the data storage device 100. The processor 200 may include a digital signal processor (DSP), a microcontroller (MCU), a central-processing unit (CPU) or a plurality of parallel processors relating the parallel processing environment to implement the operating system (OS), firmware, driver and/or other applications of the electronic device. The display 300 is utilized to display data in the data storage device 100. For example, the display 300 could be a projective display device, a 3D-image display device, an organic LED display, electronic paper, a system-integrated panel, an LED display liquid-crystal panel, or a touch display panel such as a resistive touch panel, a capacitive touch panel, an optical touch panel, or an electromagnetic touch panel.

The communication device 400 supports a wireless communication protocol in order to perform the data transmission with another electronic device. For example, the protocol for wireless communication could constitute GSM, GPRS, EDGE, UMTS, W-CDMA, CDMA2000, TD-CDMA, Bluetooth, NFC, WiFi, WiFi Direct, WiMAX, LTE, LTE-A or TD-LTE. The sensor 500 is utilized to receive an optical signal, transform the optical signal into an electrical signal, and transmit the electrical signal to the processor 200 for calculation. For example, the sensor 500 may include APS, CMOS image sensor, CCD, infra-red sensor, optical-sensing transistor, or various optical cameras. Therefore, the image of the user could be detected by the sensor 500 even in a dark or twilight environment. The notification device 600 is utilized to generate sound or light to inform other people when the processor 200 determines that the user is trembling, so that the aforementioned other people can take care of the user. For example, the indication module 208 could be an alarm, a buzzer, a warning light, a flash, or an audio signal.

Figure 1B:
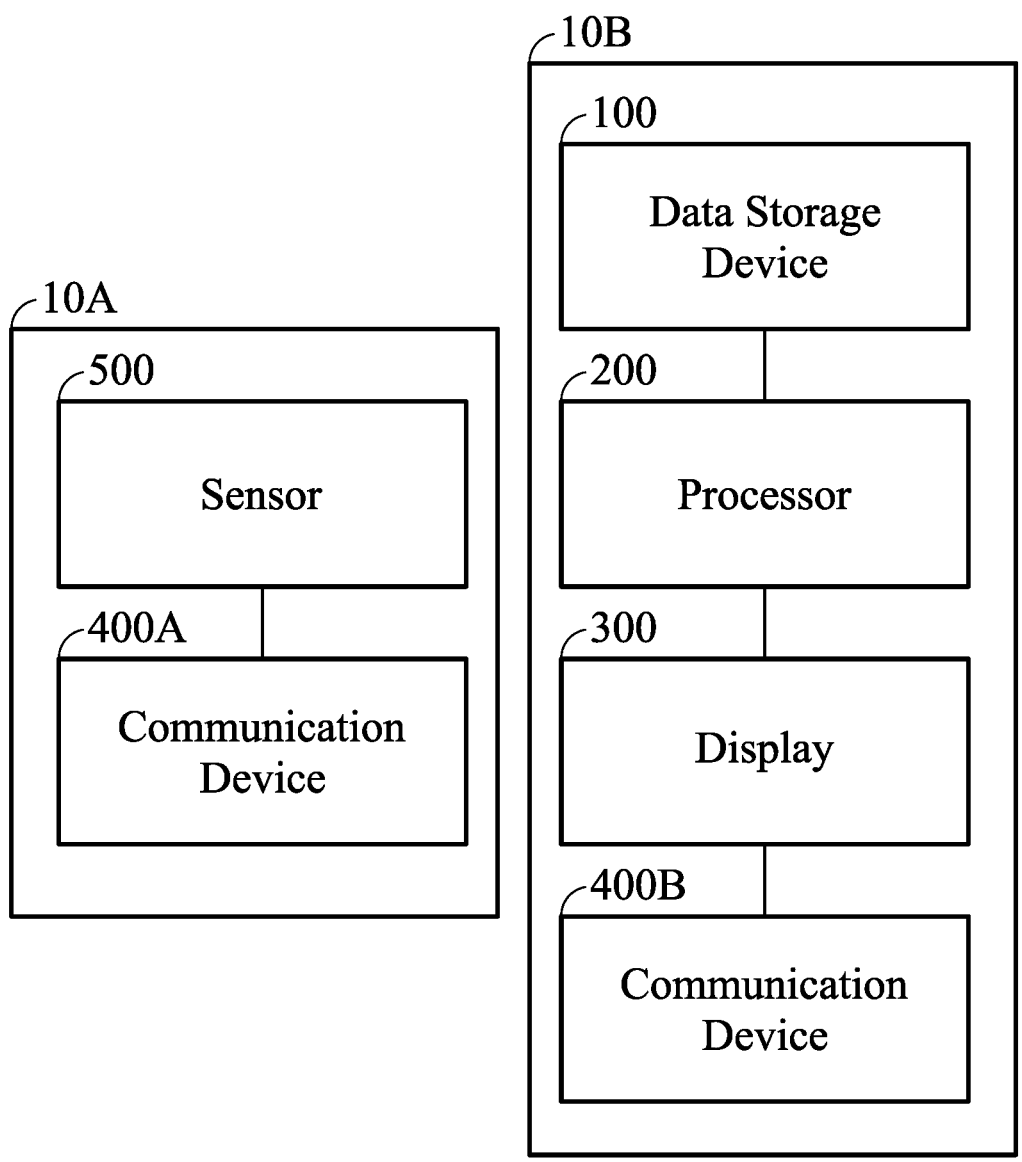
FIG. 1B is a schematic of an image detection device according to another embodiment of the invention.

FIG. 1B is a schematic of an image detection device 10 according to another embodiment of the invention. In the embodiment, the image detection device 10 is designed separately and includes two image detection devices 10A and 10B. The image detection device 10A includes a sensor 500 and a communication device 400A. The image detection device 10B includes a data storage device 100, a processor 200, a display 300 and a communication device 400B. Specifically, the image detection device 10A is installed in the environment of the user, and the image detection device 10B is the main machine. For example, the image detection device 10B could be the server, the large-scale machine or the cloud machine of the manufacture of the image detection device 10. The image detected by the sensor 500 of the image detection device 10A is transmitted to the image detection device 10B through the communication devices 400A and 400B for analysis.

Figure 2:
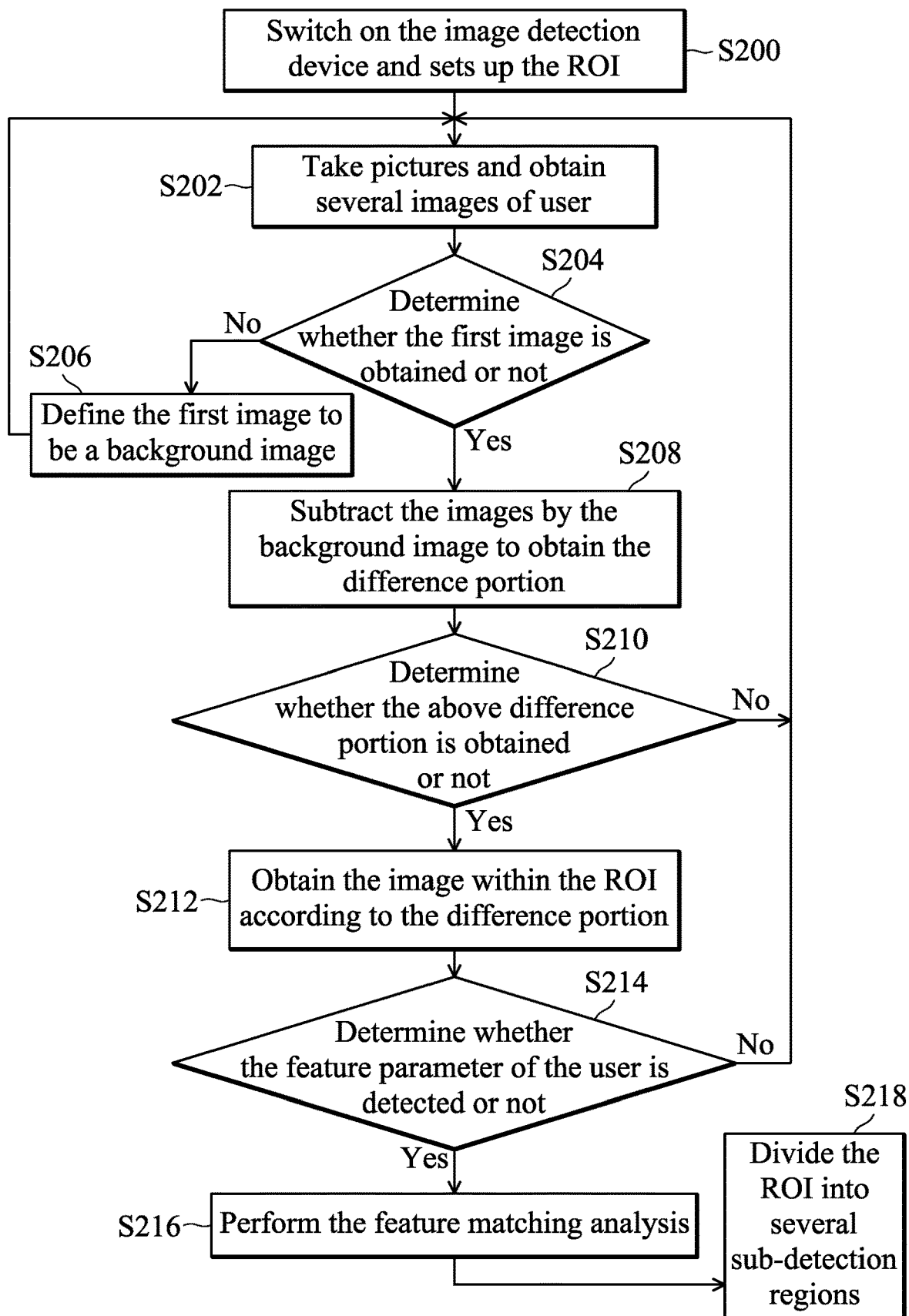
FIG. 2 is a flow chart of an image detection method according to an embodiment of the invention.

FIG. 2 is a flow chart of an image detection method according to an embodiment of the invention. In step S200, the processor 200 switches on the image detection device 10 and sets up the region of interest (ROI). In one embodiment, the image detection device 10 is utilized to determine the sleeping posture of the user. Therefore, the ROI is the bed in which the user sleeps. The ROI could be predetermined by the image detection device 10, or determined by the user based on the environment of the user. When the setting is finished, in step S202, the sensor 500 starts to take pictures and obtains several images of the ROI. For example, the sensor 500 takes 20~60 images per second to record and detect the posture of users in the ROI. The aforementioned number of images per second which are taken by the sensor 500 is merely for illustration, not for limitation. Specifically, the sensor 500 could adjust the number of images per second according to the user's specific environment and the user's specific needs. For example, when the user needs to improve the accuracy of determination, the number of images taken per second by the sensor 500 could be increased.

Afterwards, in step S204, the processor 200 determines whether the first image is obtained or not. If the first image is not obtained, step S206 will be executed so that the first image is defined to be a background image by the processor 200. If the first image is obtained, step S208 will be executed so that the processor 200 subtracts the images by the background image to obtain the difference portion. Specifically, the background image is utilized as the comparing reference for determining the posture of user. Afterwards, in step S210, the processor 200 determines whether the above difference portion is obtained or not. If the difference portion is not obtained, step S202 will be executed again so that the sensor 500 obtains several images of the user. If the difference portion is obtained, step S212 will be executed so that the image within the ROI is obtained by the processor 200 according to the difference portion.

Afterwards, in step S214, the processor 200 determines whether the feature parameter of the user is detected or not. In step S214, if the feature parameter of the user is not detected, step S202 will be executed again so that the sensor 500 obtains other images of the user. If the feature parameter of the user is detected, step S216 will be executed. In step S216, the feature matching analysis is performed by the processor 200. In one embodiment, the processor 200 determines the feature parameter for identifying the user. The feature parameter comprises any one of the limbs, any one of the facial features, the trunk of the user, or a specific pattern of a piece of clothing worn by the user. Specifically, the processor 200 performs the matching analysis on the feature parameters by utilizing the body feature such as the sketch, figure or skin color of the user, and by utilizing the moving object detection method of background subtraction, the algorithm for detecting body feature (such as OpenCV algorithm) or the classifier (such as the SVM classifier detection method), in order to determine whether the user is on the image or not.

Specifically, the moving object detection method has higher speed, but it cannot confirm whether there is a user or not. The classifier detection method has lower speed, but it can confirm whether there is a user or not. In one embodiment, the processor 200 determines whether there is an object or not by the moving object detection method, and determines whether it is user or not by the classifier detection method. In another embodiment, both the moving object detection method and the classifier detection method are utilized by the processor 200 to perform the feature matching analysis and confirm whether the user is on the image or not.

Afterwards, in step S218, the processor 200 divides the ROI into several sub-detection regions to detect the moving tendency of the user in the ROI.

Figure 3A:
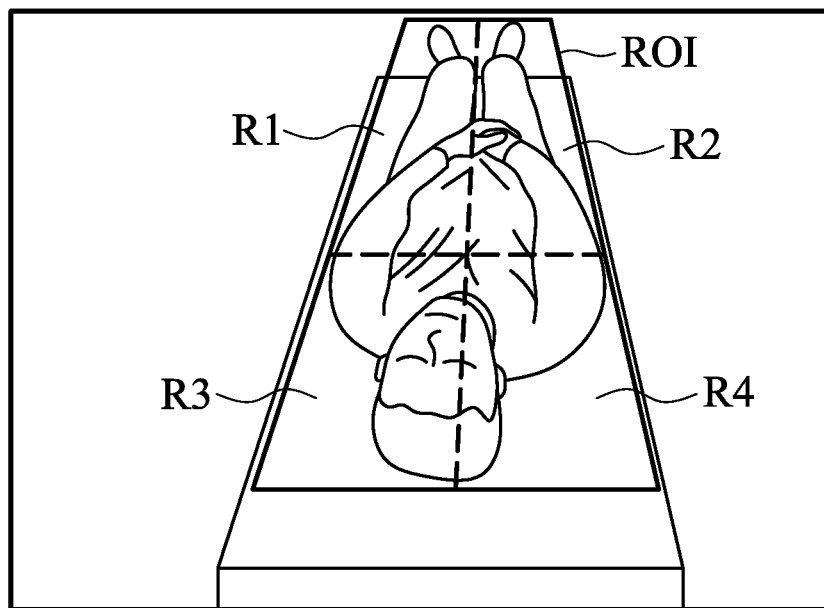
FIGS. 3A and 3B are schematics illustrating a region of interest (ROI) and its several sub-ROIs according to an embodiment of the invention.
Figure 3B:
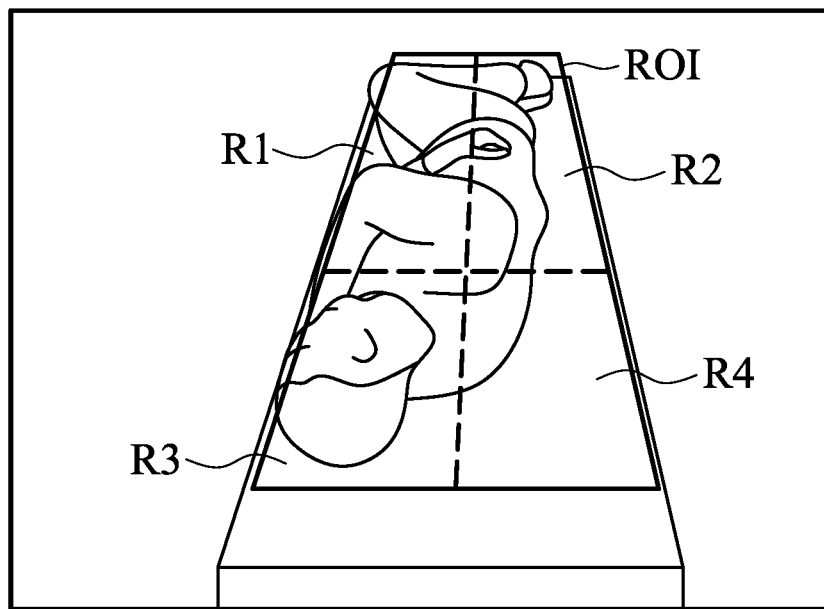

FIGS. 3A and 3B are schematics illustrating a region of interest (ROI) and its several sub-detection regions R1~R4 according to an embodiment of the invention. In one embodiment, the processor 200 divides the ROI into four sub-detection regions R1~R4 along the two-dimensional direction. The sub-detection regions R1 and R2 are parallel to the sub-detection regions R3 and R4, and the sub-detection regions R1 and R3 are parallel to the sub-detection regions R2 and R4. The sub-detection regions R1 and R2 are vertical to the sub-detection regions R1 and R3, and the sub-detection regions R1 and R2 are vertical to the sub-detection regions R2 and R4. In one embodiment, the ROI includes the sub-detection regions R1 and R3 on the left side, and the sub-detection regions R2 and R4 on the right side. In another embodiment, the ROI includes the sub-detection regions R3 and R4 on the front side, and the sub-detection regions R1 and R2 on the back side. By utilizing the arrangement of the four sub-detection regions R1~R4, the processor 200 could detect the distribution and changing of the user body on the four sub-detection regions R1~R4 to determine the moving tendency of the user (such as the lateral recumbent position or the getting-up position).

In one embodiment, as shown in FIG. 3B, the user changes from the supine position to the lateral recumbent position toward the left side. The lateral recumbent position toward the left side results in the body distribution toward the left side. Therefore, the pixel value of the left side (the sub-detection regions R1 and R3) increases, and the pixel value of the right side (the sub-detection regions R2 and R4) decreases, which are shown in the table I.

TABLE I

| Image Number | Pixel Value Of Left Side | Pixel Value Of Right Side |
| --- | --- | --- |
| 01 | 3085 | 2860 |
| 02 | 3406 | 2643 |
| 03 | 3649 | 2478 |
| 04 | 3750 | 2269 |
| 05 | 3810 | 2074 |
| 06 | 4021 | 1907 |
| 07 | 4396 | 1773 |
| 08 | 4480 | 1530 |
| 09 | 4679 | 1385 |
| 10 | 4875 | 1306 |

It should be noted that the four sub-detection regions are for illustration, not for limiting the present invention. In another embodiment, the sub-detection regions of other number or arrangement could be set up or divided by the processor according to the environment and the user's need. In another embodiment, if the pixel value of the front side (the sub-detection regions R1 and R2) increases, and the pixel value of the back side (the sub-detection regions R3 and R4) decreases, the processor 200 determines that the moving tendency of the user is getting up.

Figure 4A:
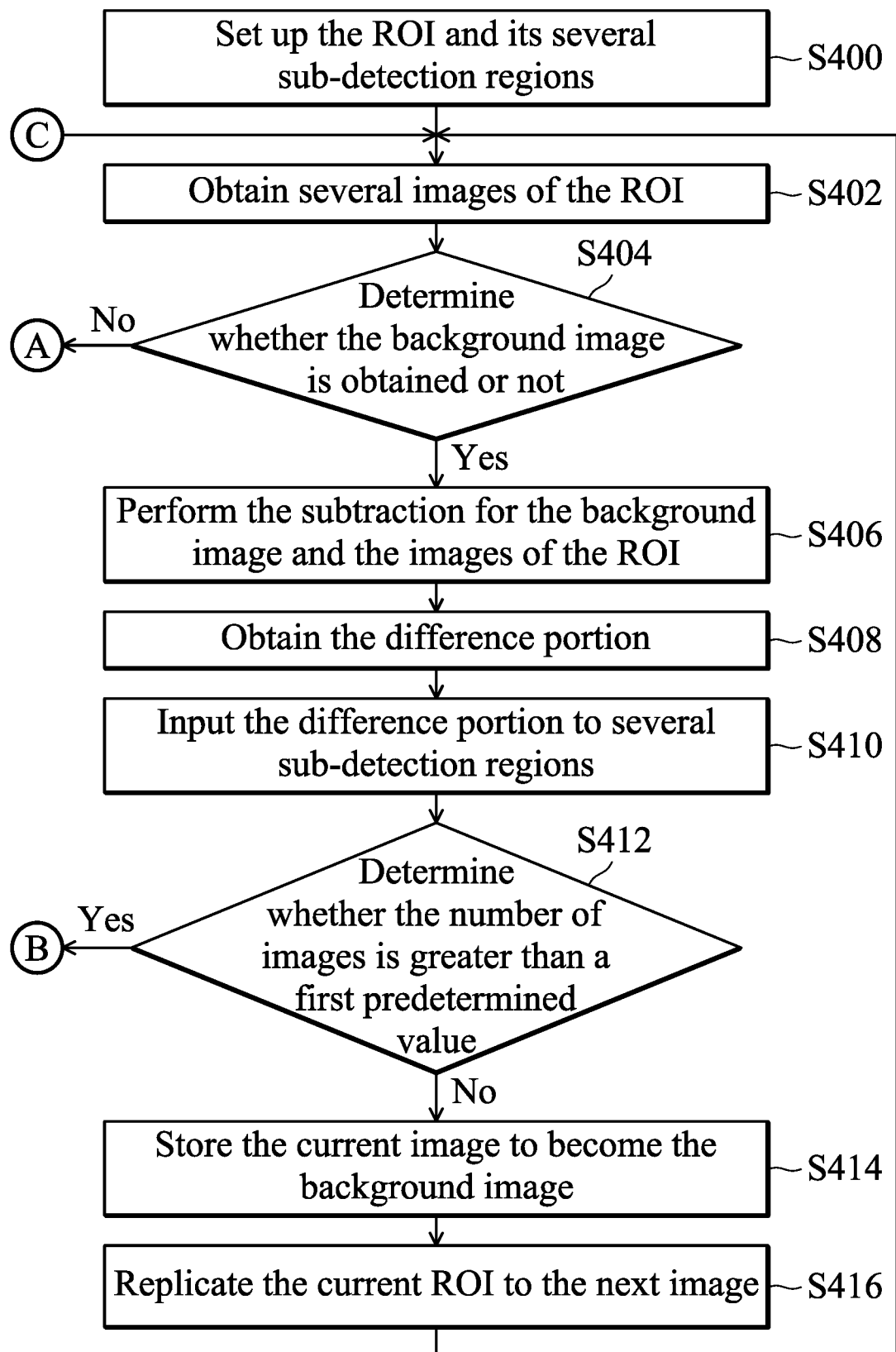
FIGS. 4A and 4B are a flow chart of detecting the moving tendency according to another embodiment of the invention.
Figure 4B:
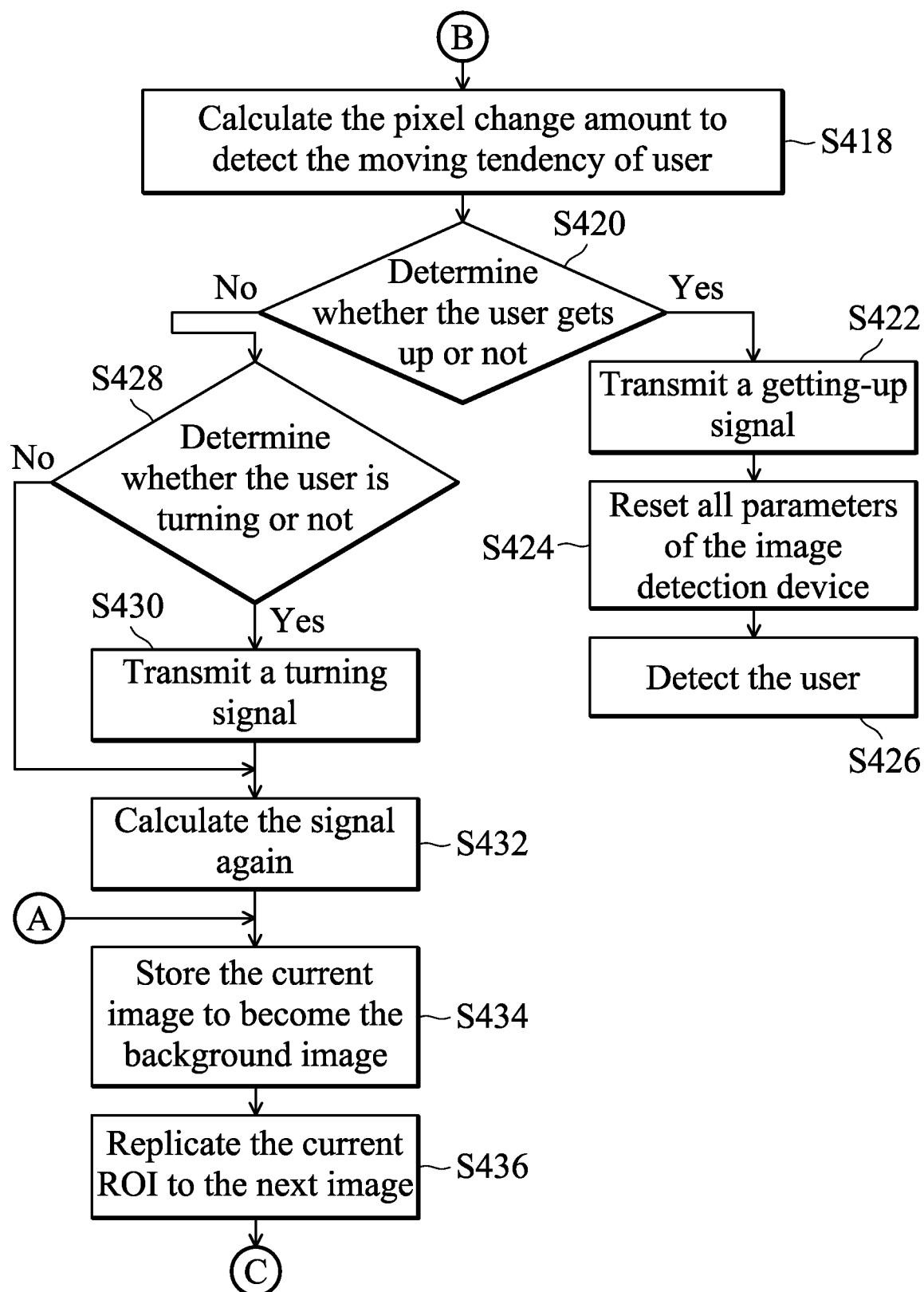
Figure 5A:
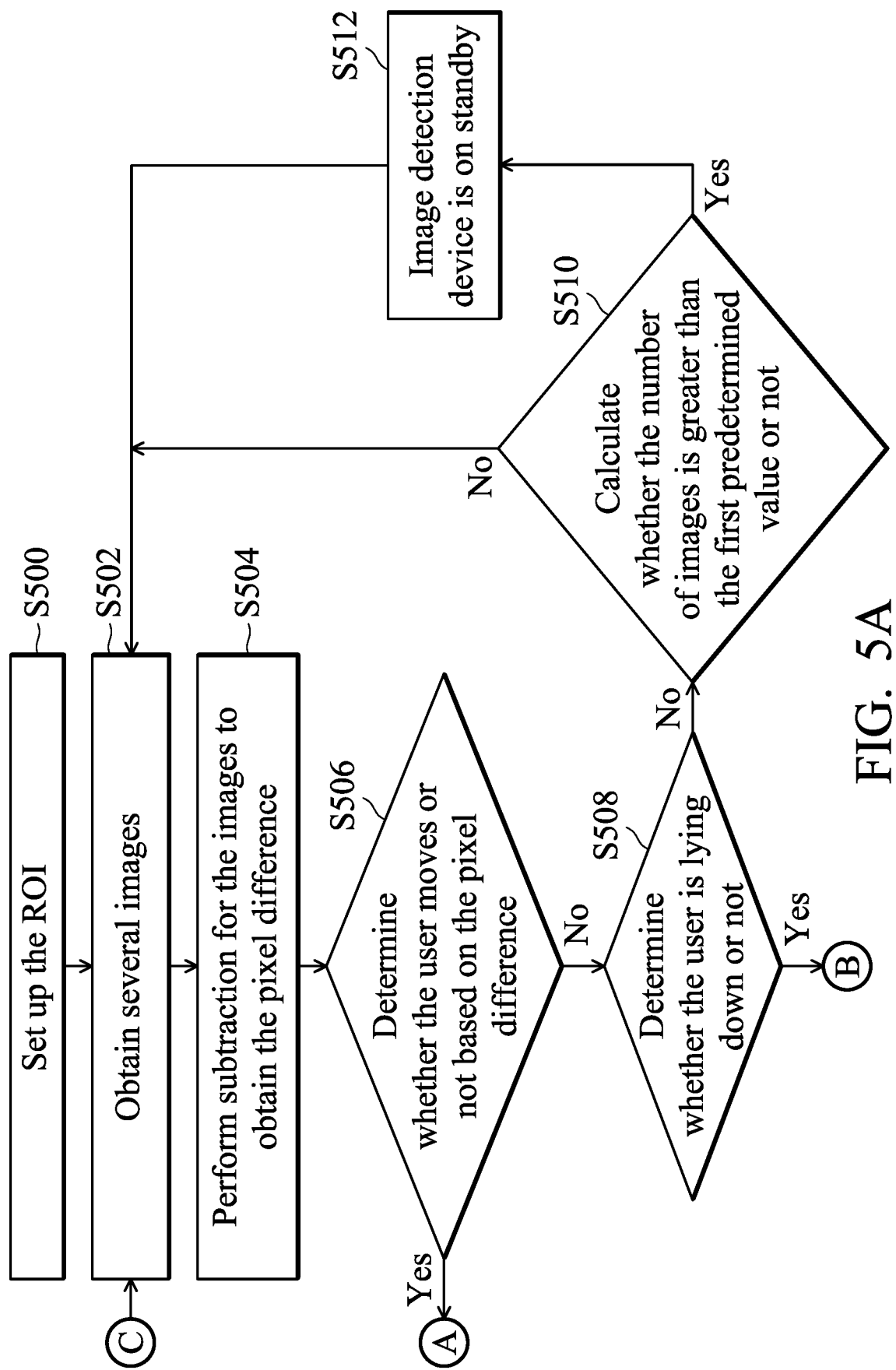
FIGS. 5A to 5E are a flow chart of the image detection method according to another embodiment of the invention.
Figure 5B:
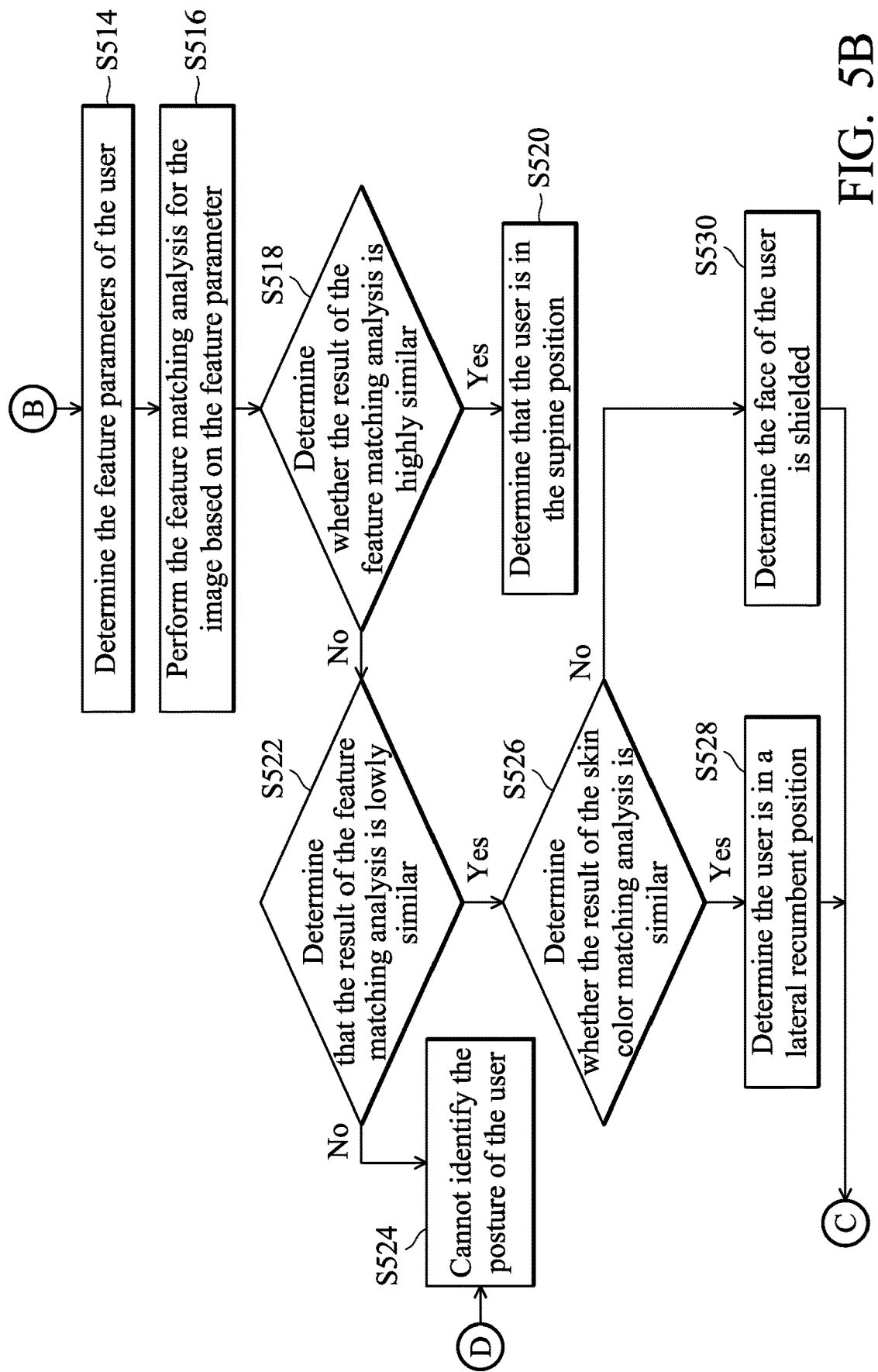
Figure 5C:
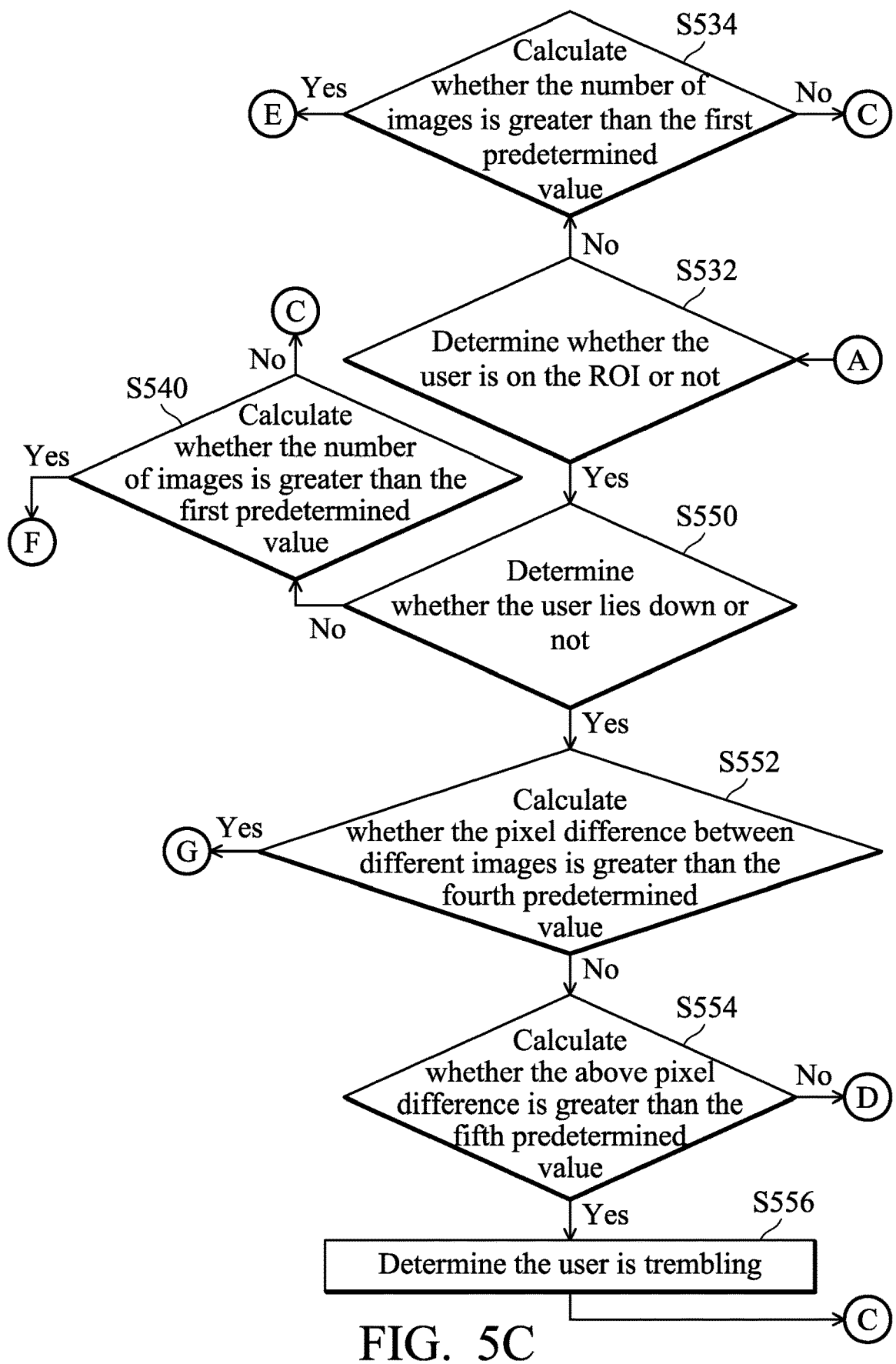
Figure 5D:
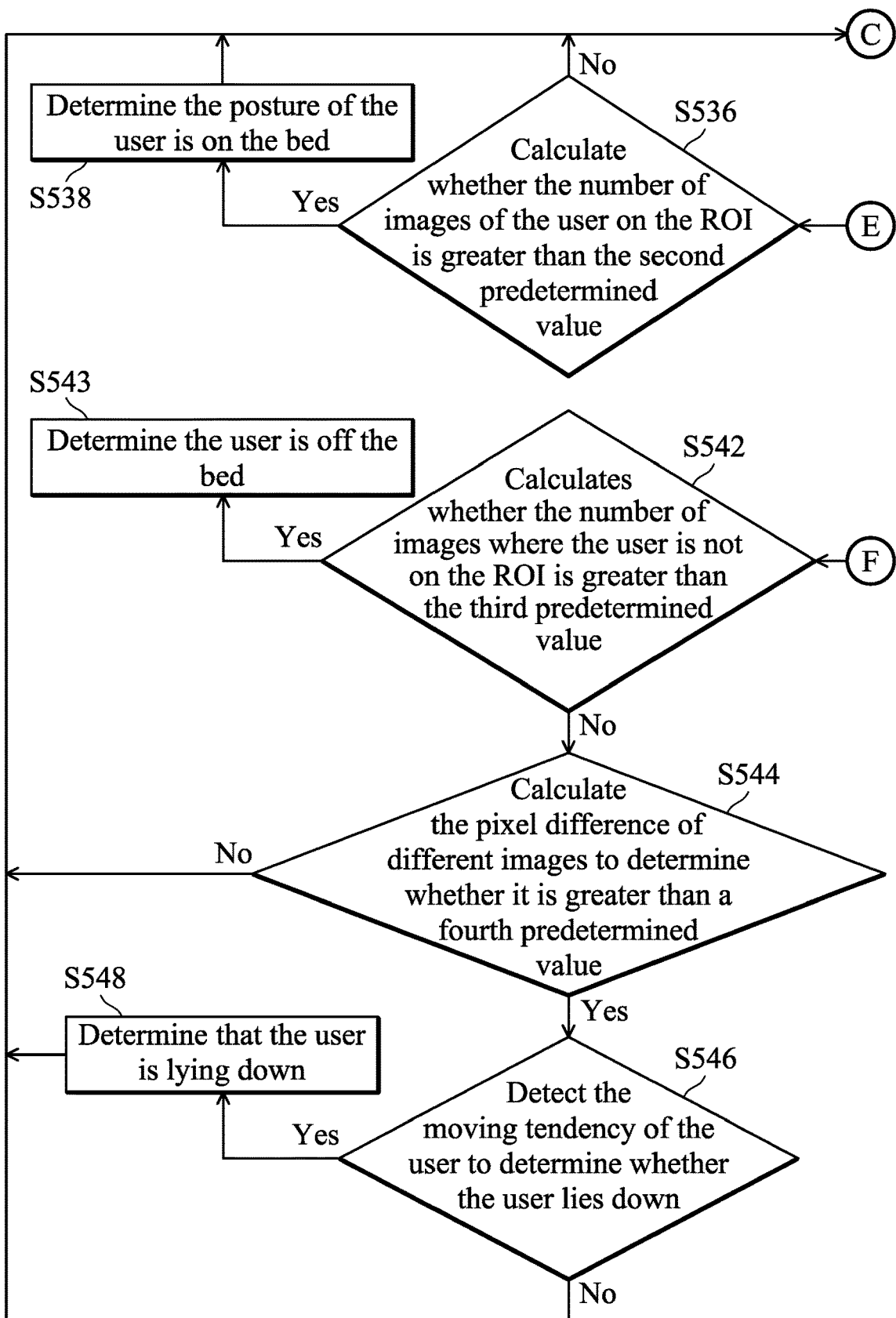
Figure 5E:
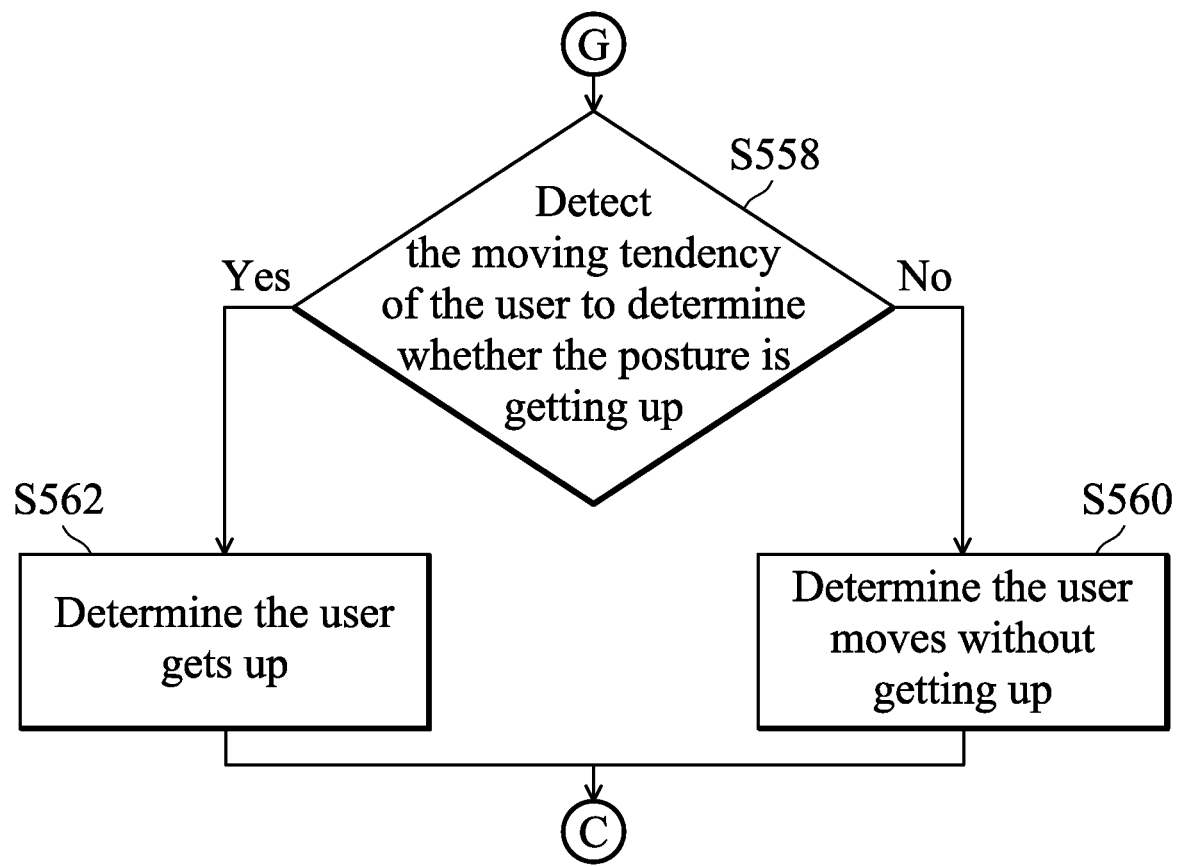

FIGS. 4A and 4B are a flow chart of detecting the moving tendency according to another embodiment of the invention. In step S400, the processor 200 sets up the ROI and its several sub-detection regions. In step S402, the sensor 500 obtains several images of the ROI. In step S404, the processor 200 determines whether the background image is obtained or not. If the background image is not obtained, step S434 will be executed. If the background image is obtained, step S406 will be executed so that the processor 200 performs the subtraction for the background image and the images of the ROI. In step S408, the processor 200 obtains the difference portion after the subtraction. In step S410, the processor 200 inputs the difference portion to several sub-detection regions. Afterwards, in step S412, the processor 200 determines whether the number of images is greater than a first predetermined value or not.

The image detection device 10 of the present invention is utilized to detect the posture of user. Therefore, enough images are required to determine changing of moving postures of the user. In step S412, when the number of images is greater than the first predetermine value (for example, 60 images), step S418 will be executed. When the number of images is not greater than the first predetermine value, step S414 will be executed so that the processor 200 stores the current image on the data storage device 100 to become the background image. Afterwards, step S416 will be executed so that the processor 200 replicates the current ROI to the next image. Afterwards, step S402 will be executed again so that the sensor 500 obtains several images of the ROI.

Furthermore, in step S418, the processor 200 calculates the pixel change amount to detect the moving tendency of user. The detailed calculation steps are illustrated in FIGS.

3A and 3B, and will not be repeated again. Afterwards, in step S420, the processor 200 determines whether the user gets up or not. If the user does not get up, step S428 will be executed. If the user gets up, step S422 will be executed so that the processor 200 transmits a getting-up signal. In step S424, the processor 200 resets all parameters of the image detection device 10. Afterwards, in step S426, the image detection device 10 detects the user. The method for detecting the user is illustrated in step S216, and will not be repeated.

In step S428, the processor 200 determines whether the user turns or not. If the user does not turn, step S432 will be executed. If the user turns, step S430 will be executed so that the processor 200 transmits a turning signal. In step S432, the processor 200 calculates the signal again. In step S434, the processor 200 stores the current image to become the background image. Afterwards, step S436 will be executed so that the processor 200 replicates the current ROI to the next image. Afterwards, step S402 will be executed again so that the sensor 500 obtains several images of the ROI.

FIGS. 5A to 5E are a flow chart of the image detection method according to another embodiment of the invention. In step S500, the processor 200 sets up the ROI. In step S502, the sensor 500 obtains several images. In step S504, the processor 200 performs subtraction for the images to obtain the pixel difference. Afterwards, in step S506, the processor 200 determines whether the user moves or not based on the pixel difference.

If the user moves, step S532 will be executed. If the user does not move, step S508 will be executed so that the processor 200 determines whether the user lies down or not. If the user lies down, step S514 will be executed so that the processor 200 determines the feature parameters of the user. For example, the feature parameter is the face or any facial feature of the user. If the user does not lie down, step S510 will be executed so that the processor 200 calculates whether the number of images is greater than the first predetermined value or not. For example, the first predetermined value is between 30 to 75 (such as 60), which is not limited by the present invention. If the number of images is not greater than the first predetermined value, step S502 will be executed. If the number of images is greater than the first predetermined value, step S512 will be executed so that the image detection device 10 is on standby.

After step S514 is executed, step S516 will be executed so that the processor 200 performs the feature matching analysis for the image based on the feature parameter. Specifically, the processor 200 utilizes the algorithm of detecting body features (such as OpenCV algorithm) and the body features such as the face, facial feature or skin color of user, matches the features of the image and the predetermined feature to determine the similarity of them. The above similarity could be quantized by value (such as 0~5 point). The higher value means they are more similar to each other.

In step S518, the processor 200 determines whether the result of the feature matching analysis is highly similar (such as 5 point). If it is highly similar (the value is 5 point), it means that obvious facial features are detected. Step S520 will be executed so that the processor 200 determines that the user is in the supine position. If it is not highly similar (the value is not greater than 5 point), step S522 will be executed so that the processor 200 determines that the result of the feature matching analysis is lowly similar (such as 0 point). If it is not lowly similar (the value is greater than 0 point), step S524 will be executed so that the processor 200 cannot identify the posture of the user. If it is lowly similar (the value is 0 point), it means some facial features are detected but not obvious which need further confirmation by matching the skin color, and step S526 will be executed so that the processor 200 determines whether the result of the skin color matching analysis is similar or not. Specifically, in step S526, the processor 200 matches the skin color of the image and the predetermined skin color to determine the similarity of them. If the skin colors are similar, step S528 will be executed so that the processor 200 determines the user is in a lateral recumbent position. If the skin colors are not similar, step S530 will be executed so that the processor 200 determines the face of the user is shielded, which means that almost no facial features of the user are detected by the image detection device 10.

In addition, when the user is determined in step S506 to be moving, step S532 will be executed so that the processor 200 determines whether the user is on the ROI or not. If the user is on the ROI, step S550 will be executed. If the user us not on the ROI, step S534 will be executed so that the processor 200 calculates whether the number of images is greater than the first predetermined value or not. For example, the first predetermined value is 30~75. If the number of images is not greater than the first predetermined value, step S502 will be executed again. If the number of images is greater than the first predetermined value, step S536 will be executed to calculate whether the number of images of the user on the ROI is greater than the second predetermined value. If it is not greater than the second predetermined value, step S502 will be executed again. If it is greater than the second predetermined value, step S538 will be executed so that the processor 200 determines the posture of the user is on the bed.

It should be noted that the second predetermined value is smaller than the first predetermined value. For example, the first predetermined value is 60, and the second predetermined value is 30. In other words, when the number of images obtained by the processor 200 exceeds 60, and the number of images where the user is on ROI is more than 30, it could be determined that the state of the user is on the bed. When the number of images obtained by the processor 200 exceeds 60, and the number of images where the user is on ROI is less than 30, more images will be required to further determine the posture of user.

Furthermore, in step S550, the processor 200 determines whether the user lies down or not. If the user lies down, step S552 will be executed. If the user does not lie down, step S540 will be executed so that the processor 200 calculates whether the number of images is greater than the first predetermined value or not. If it is not greater than the first predetermined value, step S502 will be executed again. If it is greater than the first predetermined value, step S542 will be executed so that the processor 200 calculates whether the number of images where the user is not on the ROI is greater than the third predetermined value. Specifically, the third predetermined value is smaller than the first predetermined value. If it is greater than the third predetermined value, step S543 will be executed so that the processor 200 determines the user is off the bed. If it is not greater than the third predetermined value, step S544 will be executed so that the processor 200 calculates the pixel difference of different images to determine whether it is greater than a fourth predetermined value or not.

In one embodiment, the processor 200 evaluates the pixel difference and the pixel number between images by the value. When the value is greater, it means that the pixel difference of images is greater, the pixel number is greater, and the moving or posture change of the user is more obvious. For example, the fourth predetermined value is 5000. In step S544, if it is not greater than the fourth predetermined value, step S502 will be executed again. If it is greater than the fourth predetermined value, step S546 will be executed so that the processor 200 detects the moving tendency of the user to determine whether the user lies down or not.

The details of determining the moving tendency of the user in step S546 are illustrated in FIGS. 3A and 3B, and will not be repeated again. For example, the processor 200 divides the four sub-detection region R1~R4 into the sub-detection regions R1 and R2 of the back side and the sub-detection regions R3 and R4 of the front side. If the pixel value of the front side increases, the pixel value of the back side will decrease which means that the user is just going to bed and is in the process of lying down. Afterwards, step S548 will be executed so that the processor 200 determines that the user is lying down. If the user does not lie down, step S502 will be executed again.

In addition, in step S552, the processor 200 calculates whether the pixel difference between different images is greater than the fourth predetermined value or not. If it is greater than the fourth predetermined value, step S558 will be executed. If it is not greater than the fourth predetermined value, step S554 will be executed so that the processor 200 calculates whether the above pixel difference is greater than the fifth predetermined value (such as 200). It should be noted that the fifth predetermined value is smaller than the fourth predetermined value. If the pixel difference is greater than the fifth predetermined value, step S556 will be executed so that the processor 200 determines the user is trembling. Afterwards, the notification device 600 emits an alarm signal to generate sound or notify the medical professionals that the trembling user needs care. If the pixel difference is not greater than the fifth predetermined value, step S524 will be executed so that the processor 200 cannot identify the posture of user.

Furthermore, in step S558, the processor 200 detects the moving tendency of the user to determine whether the posture is getting up or not. If not, step S560 will be executed so that the processor 200 determines the user moves without getting up. If yes, step S562 will be executed so that the processor 200 determines the user gets up. Specifically, the processor 200 divides the four sub-detection region R1~R4 into the sub-detection regions R1 and R2 of the back side and the sub-detection regions R3 and R4 of the front side. The processor 200 determines whether the user gets up or not by the pixel change of the front side and the back side. The determination steps of determining whether the user gets up or not are illustrated in FIGS. 3A and 3B, and will not be repeated.

The embodiments of the present invention subtract several images to obtain the pixel difference and determine whether the user moves or not. When it is determined that the user moves, the posture of the user is determined by performing multiple matching analysis associated with several predetermined value. In addition, the feature parameter of the face or any facial feature of the user is determined, and the feature matching analysis is performed for the images based on the feature parameter to determine the posture of user. Even the user body is shielded by clothing or bedding, the sleeping posture of the user could still be determined according to the change of sketch and figure which are shielded. By utilizing the omnidirectional image detection method, the sleeping posture of the user could be accurately identified based on the body feature and multiple matching analysis with several predetermined value no matter whether the face is identified or not. Therefore, the purpose of taking care of the user can be achieved.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image detection method for determining a posture of a user, comprising:
    obtaining a plurality of images of a user;
    determining whether the user moves or not;
    when it is determined that the user moves, calculating whether a number of the images is greater than a first predetermined value or not, calculating whether the number of the images where the user is on a region of interest (ROI) is greater than a second predetermined value or not, and calculating whether the number of the images where the user is not on the ROI is greater than a third predetermined value or not, in order to determine the posture of the user; and
    in response to the number of the images being greater than the first predetermined value, detecting a moving tendency of the user to determine whether the user is getting up or changing between a supine position and a lateral recumbent position,
    wherein detecting the moving tendency of the user comprises:
        dividing the ROI into a plurality of sub-detection regions; and
        calculating change and distribution of pixels of the user's body in each of the sub-detection regions of the user by the images to obtain the moving tendency.

2. The image detection method as claimed in claim 1, further comprising:
    calculating pixel value included by each of the images, subtracting two of the images to obtain a pixel difference, and determining whether the user moves or not according to the pixel difference.

3. The image detection method as claimed in claim 1, further comprising: when it is determined that the user does not move, executing a feature matching analysis for the images based on a feature parameter of the user to determine the posture of the user.

4. The image detection method as claimed in claim 3, wherein the ROI is a bed where the user lies down, and the feature parameter comprises face, skin color or any facial feature of the user.

5. The image detection method as claimed in claim 4, further comprising:
    whether the user is in the supine position or not is determined by the feature matching analysis.

6. The image detection method as claimed in claim 5, further comprising:

when it is determined that the user is not in the supine position, executing a skin color matching analysis for the images, wherein:
when a result of the skin color matching analysis is similar, it is determined that the user is in the lateral recumbent position; and
when the result of the skin color matching analysis is not similar, it is determined that the face of the user is shielded.

7. The image detection method as claimed in claim 1, further comprising: when the number of the images is greater than the first predetermined value, calculating the number of images where the user is on the ROI is greater than the second predetermined value or not, wherein:
when the number of images where the user is on the ROI is greater than the second predetermined value, determining that the user is on a bed.

8. The image detection method as claimed in claim 1, further comprising when the number of the images is greater than the first predetermined value, calculating the number of images where the user is not on the ROI is greater than the third predetermined value or not, wherein:
when the number of images where the user is not on the ROI is greater than the third predetermined value, determining that the user is off a bed.

9. The image detection method as claimed in claim 8, wherein:
when the number of images where the user is not on the ROI is not greater than the third predetermined value, calculating whether the pixel difference is greater than a fourth predetermined value or not; and
when the pixel difference is greater than the fourth predetermined value, detecting a moving tendency of the user to determine whether the user lies down or not.

10. The image detection method as claimed in claim 9, further comprising: when the pixel difference is greater than the fourth predetermined value, detecting the moving tendency of the user to determine whether the user gets up or moves without getting up.

11. The image detection method as claimed in claim 10, further comprising: when the pixel difference is not greater than the fourth predetermined value, calculating whether the pixel difference is greater than a fifth predetermined value or not, wherein the fifth predetermined value is smaller than the fourth predetermined value, and it is determined that the user is trembling when the pixel difference is greater than the fifth predetermined value.

12. An image detection device, comprising:
a sensor, configured to obtain a plurality of images of a user;
a notification device; and
a processor, configured to determine whether the user moves or not, wherein:
when it is determined that the user moves, the processor calculates whether number of the images is greater than a first predetermined value or not, calculates whether number of the images where the user is on a region of interest (ROI) is greater than a second predetermined value or not, and calculates whether number of the images where the user is not on the ROI is greater than a third predetermined value or not, in order to determine the posture of the user,
wherein in response to the number of the images being greater than the first predetermined value, the processor detects a moving tendency of the user to determine whether the user is getting up or changing between a supine position and a lateral recumbent position,
wherein the processor divides the ROI into a plurality of sub-detection regions, and calculates change and distribution of pixels of the user's body in each of the sub-detection regions of the user by the images to obtain the moving tendency.

13. The image detection device as claimed in claim 12, further comprising:
the processor further calculates pixel value included by each of the images, subtracts two of the images to obtain a pixel difference, and determines whether the user moves or not according to the pixel difference.

14. The image detection device as claimed in claim 12, wherein when it is determined that the user does not move, the processor executes a feature matching analysis for the images based on a feature parameter of the user to determine the posture of the user.

15. The image detection device as claimed in claim 14, wherein the ROI is a bed where the user lies down, and the feature parameter comprises face, skin color or any facial feature of the user.

16. The image detection device as claimed in claim 15, wherein:
the processor determines whether the user is in the supine position or not by the feature matching analysis.

17. The image detection device as claimed in claim 16, wherein:
when it is determined that the user is not in the supine position, the processor executes a skin color matching analysis for the images, wherein:
when a result of the skin color matching analysis is similar, the processor determines that the user is in the lateral recumbent position; and
when the result of the skin color matching analysis is not similar, the processor determines that the face of the user is shielded.

18. The image detection device as claimed in claim 12, wherein when the number of the images is greater than the first predetermined value, the processor calculates the number of images where the user is on the ROI is greater than the second predetermined value or not, wherein:
when the number of images where the user is on the ROI is greater than the second predetermined value, the processor determines that the user is on a bed.

19. The image detection device as claimed in claim 12, wherein when the number of the images is greater than the first predetermined value, the processor calculates the number of images where the user is not on the ROI is greater than the third predetermined value or not, wherein:
when the number of images where the user is not on the ROI is greater than the third predetermined value, the processor determines that the user is off a bed.

20. The image detection device as claimed in claim 19, wherein:
when the number of images where the user is not on the ROI is not greater than the third predetermined value, the processor calculates whether the pixel difference is greater than a fourth predetermined value or not; and
when the pixel difference is greater than the fourth predetermined value, the processor detects a moving tendency of the user to determine whether the user lies down or not.

21. The image detection device as claimed in claim 12, wherein when the pixel difference is greater than the fourth predetermined value, the processor detects the moving tendency of the user to determine whether the user gets up or moves without getting up.

22. The image detection device as claimed in claim 21, wherein when the pixel difference is not greater than the fourth predetermined value, the processor calculates whether the pixel difference is greater than a fifth predetermined value or not, wherein the fifth predetermined value is smaller than the fourth predetermined value, and the processor determines that the user is trembling when the pixel difference is greater than the fifth predetermined value.

* * * * *